United States Patent [19]

Gyugyi

[11] 4,437,052
[45] Mar. 13, 1984

[54] STATIC VAR GENERATOR
[75] Inventor: Laszlo Gyugyi, Penn Hills, Pa.
[73] Assignee: Westinghouse Electric Corp., Pittsburgh, Pa.
[21] Appl. No.: 331,940
[22] Filed: Dec. 17, 1981
[51] Int. Cl.$^3$ .............................................. H02J 3/18
[52] U.S. Cl. .................................................... 323/210
[58] Field of Search ........................ 323/206, 208–211, 323/361

[56] References Cited

U.S. PATENT DOCUMENTS

| | | | |
|---|---|---|---|
| 1,655,038 | 1/1928 | Alexanderson | 323/210 |
| 2,640,963 | 6/1953 | Sörensen et al. | 323/361 |
| 3,551,799 | 12/1970 | Koppelmann | 323/210 |
| 3,992,661 | 11/1976 | Kelley | 323/210 |
| 3,999,117 | 12/1976 | Gyugyi et al. | 323/210 |
| 4,028,614 | 6/1977 | Kelley | 323/210 |

FOREIGN PATENT DOCUMENTS 610061 10/1948 United Kingdom ................ 323/206

OTHER PUBLICATIONS

Fiebiger et al., "Thyristor Static Compensator for the Cern Intermediate Booster Accelerator", ACEC Review (Belgium), No. 3, 1980, pp. 2–6, S20320019.

Primary Examiner—A. D. Pellinen
Attorney, Agent, or Firm—Benjamin Hudson, Jr.

[57] ABSTRACT

There is provided a static VAR generator generally comprised of a fixed capacitor bank and a first and second switched conductor bank whereby said second switched inductor bank is operated at voltages leading the first inductor bank by 30 electrical degrees to allow the VAR generator to adjust its output current twice in each half cycle of operation.

4 Claims, 2 Drawing Figures

STATIC VAR GENERATOR

BACKGROUND OF THE INVENTION

1. Field of the Invention

This invention relates generally to static VAR generators and more particularly to static VAR generators employing controlled inductance means switched in combination with capacitance means into an AC network to regulate power factor and terminal voltage.

2. Description of the Prior Art

The basic function of a static VAR generator is to supply controlled reactive power for an electrical network to reduce terminal voltage variation and to improve load power factor. Inherent in all static VAR generator designs utilizing anti-parallel switching thyristors is a delay in response resulting from the requirement that a sampling of the systems reactive demand must be made plus computations determining the reactive compensation prior to any corrective action. Additionally, after the computations are complete the output current for the VAR generator can be adjusted only once in each half cycle. Consequently, after the first sampling and computation time elapses, if the reactive demand should change suddenly, the VAR generator cannot further adjust its output current until the next half cycle. It would be desirable for a VAR generator design to have the capability to allow further corrective action to be taken in response to any reactive demand change that may occur after the first sampling and computation time interval for each half cycle.

SUMMARY OF THE INVENTION

There is provided by this invention a static VAR generator arrangement that employs two three-phase thyristor controlled inductor banks. One inductor bank operates from a set of voltages obtained from a phase shifting transformer that leads AC network voltage from which the other inductor bank is operated. A control signal is derived for each thyristor controlled inductor synchronized to the voltage source at the inductor bank. This control signal contains the information for the required reactive compensation to the AC network. With this arrangement the output current of the VAR generator can be changed twice in each half cycle.

DESCRIPTION OF THE PREFERRED EMBODIMENT

Figure 1:
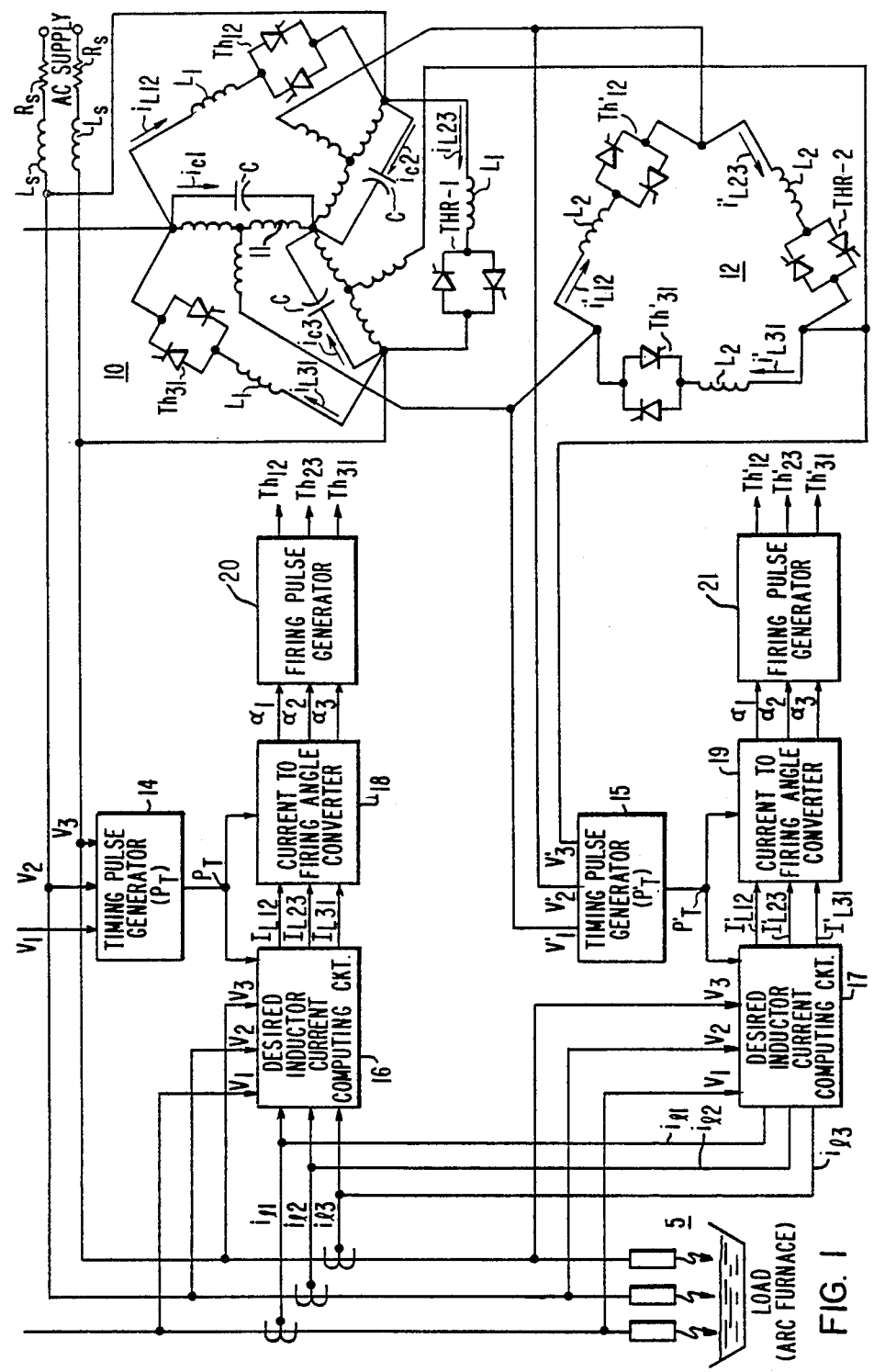
FIG. 1 is a functional block diagram of a static VAR generator connected to an AC network and a rapidly varying load incorporating the principles of this invention.

Referring to FIG. 1 there is shown a static VAR generator connected to an AC network and a rapidly varying load such as an arc furnace 5. The VAR generator is generally comprised of a fixed capacitor bank C connected in a wye configuration to the AC network. A first inductor bank 10 having delta connected inductors $L_1$ is disposed to be switched into the AC network by means of anti-parallel thyristors THR-1. Also connected to the AC network is the input terminals of an auto-transformer 11. A second inductor bank 12 is connected to the output terminals of the auto-transformer 11 having inductors $L_2$ in a delta-configuration in such a manner that the inductors $L_2$ are operated at voltages phase-shifted by 30 electrical degrees. The inductors $L_2$ of the inductor bank 12 are also disposed to be switched into the AC network by means of anti-parallel thyristors THR-2.

The inductors in the two inductor banks 10 and 12 are inserted into the AC network to control reactive power by phase angle firing the thyristors THR-1 and THR-2. Two separate control channels for each inductor bank is employed. Timing pulse generators 14 and 15 provide timing pulses $P_T$ and $P_T'$ synchronized to the voltage supply of the respective inductor bank. The timing pulses $P_T$ obtained from pulse generator 14 are synchronized to the AC network. Similarly, timing pulses $P_T'$ from pulse generator 14 are synchronized to the voltages phase shifted 30 degrees by the auto-transformer 11. The signals $P_T$ and $P_T'$ are inputted into an inductor current computing circuits 16, 17 and current to firing angle converters 18, 19. Two sets of desired inductor currents $I_{L12}$, $I_{L23}$, $I_{L31}$ and $I_{L12}'$, $I_{L23}'$, $I_{L31}'$ are computed during the computation intervals by circuits 16 and 17 for the inductor banks 10 and 12 respectively. Because of the phase shifted voltages $V_{12}'$, $V_{23}'$ and $V_{31}'$ inductor currents $I_{L12}'$, $I_{L23}'$, $I_{L31}'$ are computed 30 electrical degrees earlier than the currents $I_{12}$, $I_{23}$ and $I_{31}$ of the inductor bank 10. From the two sets of computed currents, current-to-firing angle converters 18 and 19 derive firing angles $\alpha_{12}$, $\alpha_{23}$, $\alpha_{31}$ and $\alpha_{12}'$, $\alpha_{23}'$, $\alpha_{31}'$ for the anti-parallel thyristors THR-1 and THR-2 respectively. The output of the firing angle converters 18 and 19 are amplified by firing pulse generators 20 and 21 which directly control the firing of thyrisors THR-1 and THR-2. Since the firing angles $\alpha_{12}'$, $\alpha_{23}'$ and $\alpha_{31}'$ of inductor bank 12 lead those of inductor bank 10 by 30 electrical degrees, inductor bank 12 is operated in advance of inductor bank 10 resulting in overall improvement of response and accuracy in reactive control of the VAR generator.

Figure 2:
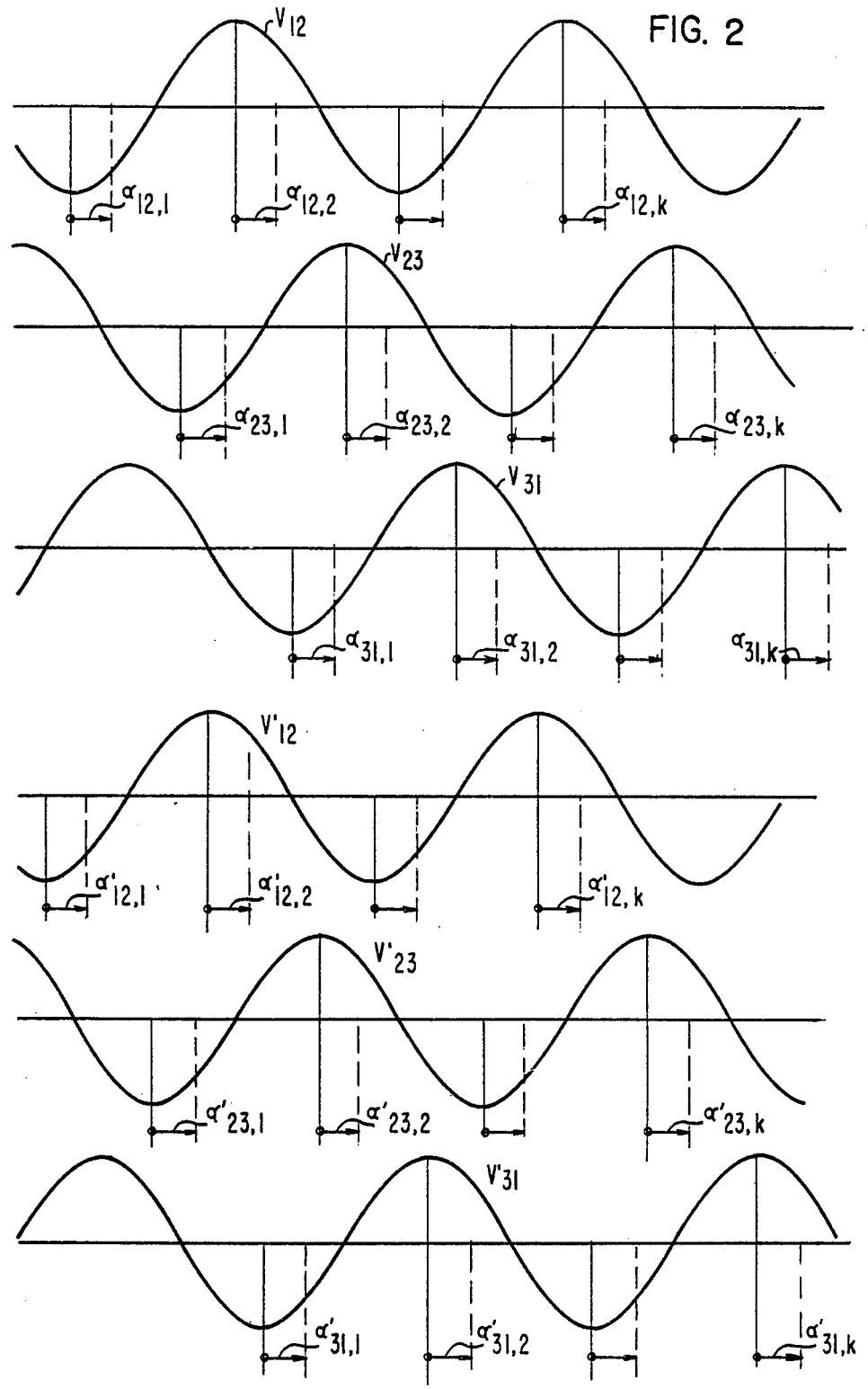
FIG. 2 are wave forms of the three-phase voltages for the reactor banks of the VAR generator shown in FIG. 1 with respective phase firing angles.

Referring now to FIG. 2, to exploit the possibility that the inductor bank 12 connected to the phase shifting auto-transformer 11 can be operated in advance of the inductor bank 10, it is necessary to compute the desired inductor currents over two different computation intervals. This requirement can be accomplished by using appropriate power quantities in the computation of the desired inductor current. Consider FIG. 2, where the two sets of line-to-line voltages $V_{12}$, $V_{23}$, $V_{31}$ and $V_{12}'$, $V_{23}'$ and $V_{31}'$ are shown together with the corresponding sets of firing angles $\alpha_{12}$, $\alpha_{23}$, $\alpha_{31}$ and $\alpha_{12}'$, $\alpha_{23}'$, $\alpha_{31}'$. The computation of the desired inductor currents, which define the firing angles, is carried out between the two subsequent voltage peaks that represent the two subsequent earliest firing points of thyristors THR-2 and THR-1 respectively.

The desired inductor currents of the three branches of the two delta connected inductor banks 10 and 12 can be calculated in any half cycle interval of the applied voltage preceding the earliest firing points by the following equations.

$$I_{L12,k} = I_{C\Delta} - \frac{1}{V\pi} \left[ K_1 \int_{\alpha_{12,(k-1)} = 0}^{\alpha_{12,k} = 0} v_{23} i_2 d(\omega t) - \right. \quad (1)$$

-continued $$I_{L23,k} = I_{C\Delta} - \frac{1}{V\pi}\left[ K_1 \int v_{31}i_{l1}d(\omega t) - \begin{matrix} \alpha_{12,k} = 0 \\ \alpha_{12,(k-1)} = 0 \end{matrix} \right.$$

$$\left. K_2 \int v_{31}i_{l1}d(\omega t) \begin{matrix} \alpha_{12,k} = 0 \\ \alpha_{12,(k-1)} = 0 \end{matrix} \right] \quad (2)$$

$$I_{L23,k} = I_{C\Delta} - \frac{1}{V\pi}\left[ K_1 \int v_{31}i_{l3}d(\omega t) - \begin{matrix} \alpha_{23,k} = 0 \\ \alpha_{23,(k-1)} = 0 \end{matrix} \right.$$

$$\left. K_2 \int v_{12}i_{l2}d(\omega t) \begin{matrix} \alpha_{23,k} = 0 \\ \alpha_{23,(k-1)} = 0 \end{matrix} \right] \quad (3)$$

$$I_{L31,k} = I_{C\Delta} - \frac{1}{V\pi}\left[ K_1 \int v_{12}i_{l1}d(\omega t) - \begin{matrix} \alpha_{31,k} = 0 \\ \alpha_{31,(k-1)} = 0 \end{matrix} \right.$$

$$\left. K_2 \int v_{23}i_{l3}d(\omega t) \begin{matrix} \alpha_{31,k} = 0 \\ \alpha_{31,(k-1)} = 0 \end{matrix} \right] \quad$$

$$I'_{L12,k} = I_{C\Delta} - \frac{1}{V\pi}\left[ K_1 \int v_{23}i_{l2}d(\omega t) - \begin{matrix} \alpha'_{12,k} = 0 \\ \alpha'_{12,(k-1)} = 0 \end{matrix} \right.$$

$$\left. K_2 \int v_{31}i_{l1}d(\omega t) \begin{matrix} \alpha'_{12,k} = 0 \\ \alpha'_{12,(k-1)} = 0 \end{matrix} \right] \quad (4)$$

$$I'_{L23,k} = I_{C\Delta} - \frac{1}{V\pi}\left[ K_1 \int v_{31}i_{l3}d(\omega t) - \begin{matrix} \alpha'_{23,k} = 0 \\ \alpha'_{23,(k-1)} = 0 \end{matrix} \right.$$

$$\left. K_2 \int v_{12}i_{l2}d(\omega t) \begin{matrix} \alpha'_{23,k} = 0 \\ \alpha'_{23,(k-1)} = 0 \end{matrix} \right] \quad (5)$$

$$I'_{L31,k} = I_{C\Delta} - \frac{1}{V\pi}\left[ K_1 \int v_{12}i_{l1}d(\omega t) - \begin{matrix} \alpha'_{31,k} = 0 \\ \alpha'_{31,(k-1)} = 0 \end{matrix} \right.$$

$$\left. K_2 \int v_{23}i_{l3}d(\omega t) \begin{matrix} \alpha'_{31,k} = 0 \\ \alpha'_{31,(k-1)} = 0 \end{matrix} \right] \quad (6)$$

where $I_{C\Delta}$ is the amplitude of the fixed capacitor current, referred to delta connection, that is $$I_{C\Delta} = (V/3)\omega C$$

V is the amplitude of the line-to-line voltage in both the AC supply and auxiliary voltage sets
C is the capacitance of one branch of the (wye connected) capacitor bank
$\omega$ is the angular frequency of the AC supply $$K_1 = \frac{R_s}{3\omega L_s} - \frac{1}{\sqrt{3}}$$

$$K_2 = \frac{R_s}{3\omega L_s} - \frac{1}{\sqrt{3}}$$

$v_{12}$, $v_{23}$, $v_{31}$ are the line-to-line voltages of the three-phase AC supply
$v_{12}'$, $v_{23}'$, $v_{31}'$ are the line-to-line auxiliary voltages obtained at the terminals of the phase shifting transformer
$i_{l1}$, $i_{l2}$, $i_{l3}$ are the three load (line) currents $\alpha_{12,k}$, $\alpha_{23,k}$, $\alpha_{31,k}$ are the firing angles measured from the kth peak of voltage $v_{12}$, $v_{23}$, and $v_{31}$, respectively
$\alpha_{12,k}'$, $\alpha_{23,k}'$, $\alpha_{31,k}'$ are the firing angles measured from the kth peak of auxiliary voltage $v_{12}'$, $v_{23}'$, and $v_{31}'$, respectively
$\alpha_{12,k}=0$, $\alpha_{23,k}=0$, $\alpha_{31,k}=0$, $\alpha_{12,k}'=0$, $\alpha_{23,k}'=0$, $\alpha_{31,k}'=0$, define the earliest firing points, which, in the present case coincide with the kth peak of the corresponding voltages From the desired inductor currents, the corresponding firing angles can be determined from the following relationships:

$$I_{L12,k} = \frac{4}{\pi} \cdot \frac{\pi V}{\omega L}\left[ \frac{\pi}{2} - \alpha_{12,k} - \tfrac{1}{2}\sin(2\,\alpha_{12,k}) \right] \quad (7)$$

$$I_{L23,k} = \frac{4}{\pi} \cdot \frac{\pi V}{\omega L}\left[ \frac{\pi}{2} - \alpha_{23,k} - \tfrac{1}{2}\sin(2\,\alpha_{23,k}) \right] \quad (8)$$

$$I_{L31,k} = \frac{4}{\pi} \cdot \frac{\pi V}{\omega L}\left[ \frac{\pi}{2} - \alpha_{31,k} - \tfrac{1}{2}\sin(2\,\alpha_{31,k}) \right] \quad (9)$$

and, $$I'_{L12,k} = \frac{4}{\pi} \cdot \frac{\pi V}{\omega L}\left[ \frac{\pi}{2} - \alpha'_{12,k} - \tfrac{1}{2}\sin(2\,\alpha'_{12,k}) \right] \quad (10)$$

$$I'_{L23,k} = \frac{4}{\pi} \cdot \frac{\pi V}{\omega L}\left[ \frac{\pi}{2} - \alpha'_{23,k} - \tfrac{1}{2}\sin(2\,\alpha'_{23,k}) \right] \quad (11)$$

$$I'_{L31,k} = \frac{4}{\pi} \cdot \frac{\pi V}{\omega L}\left[ \frac{\pi}{2} - \alpha'_{31,k} - \tfrac{1}{2}\sin(2\,\alpha'_{31,k}) \right] \quad (12)$$

Referring again to FIG. 1 control circuits for the timing pulse generators 14, 15; the inductor current computing circuits 16, 17; the current-to-firing angle convertor 18, 19; and the firing pulse generator 20, 21 are more specifically described in U.S. Pat. No. 3,999,117 issued Dec. 21, 1976 to Laszlo Gyugyi et al., assigned to the assignee of the present application and is incorporated herein by reference. The inductor current computing circuits 16 and 17 further incorporates an improvement to the resettable integrator RI that provides improved response based on the equations 1-6 herein recited.

It can be readily seen that there is provided by this invention a new and improved static VAR generator design that allows the reactive power to be adjusted twice as often in any cycle that compensation is demanded compared to prior art design.

Although there has been illustrated and described a specific embodiment, it is clearly understood that the same were merely for purposes of illustration and that changes and modifications may be readily made therein by those skilled in the art without departing from the spirit and scope of this invention.

I claim:
1. A static VAR generator, comprising:
   (a) a capacitive current means disposed for connection into an AC network;
   (b) a first inductive current means disposed for connection into said AC network;
   (c) a second inductive current means disposed for connection into said AC network;

(d) a VAR monitoring means for monitoring the reactive requirement of said AC network;

(e) a first control means connected to said first inductive current means, and said VAR monitoring means in phase with the AC network voltage for controlling connection of said first inductive current means into the AC network in response to the reactive requirements of said AC network; and (f) a phase shifting means connected to said second inductive current means and a second control means responsive to the phase shifting means for controlling connection of said second inductive current means at a voltage phase angle leading the voltage of said first control means.

2. A static VAR generator as recited in claim 1 wherein said voltage phase angle leading the voltage of said first control means is approximately 30 electrical degrees.

3. A static VAR generator as recited in claim 1 wherein said phase shifting means is generally comprised of an auto-transformer having a primary connected to said AC network and a secondary connected to said second control means and said second inductive current means whereby said second control means controls connection of said second inductive current means at a voltage phase angle leading the voltage of said first control means.

4. A static VAR generator as recited in claim 3 wherein said voltage phase angle leading the voltage of said first control means is approximately 30 electrical degrees.

* * * * *